(12) United States Patent
Gafni

(10) Patent No.: US 8,662,513 B2
(45) Date of Patent: Mar. 4, 2014

(54) RECYCLABLE CARDBOARD BICYCLE

(71) Applicant: Izhar Gafni, Hefer (IL)

(72) Inventor: Izhar Gafni, Hefer (IL)

(73) Assignee: I.G. Cardboard Technologies Ltd., Ahituv (IL)

( * ) Notice: Subject to any disclaimer, the term of this patent is extended or adjusted under 35 U.S.C. 154(b) by 0 days.

(21) Appl. No.: 13/684,733

(22) Filed: Nov. 26, 2012

(65) Prior Publication Data

US 2013/0076002 A1  Mar. 28, 2013

Related U.S. Application Data

(63) Continuation of application No. 12/631,831, filed on Dec. 6, 2009, now abandoned.

(51) Int. Cl.
*B62K 1/00* (2006.01)

(52) U.S. Cl.
USPC ............................. 280/210; 280/200; 280/259

(58) Field of Classification Search
USPC .......................................... 280/210, 200, 259
See application file for complete search history.

(56) References Cited

U.S. PATENT DOCUMENTS

| | | |
|---|---|---|
| 617,536 A | 1/1899 | Martin |
| 1,754,887 A | 4/1930 | Gentry |
| 2,393,776 A | 1/1946 | Horr |
| 3,083,036 A | 3/1963 | Cornell et al. |
| 3,492,016 A | 1/1970 | O'Connor et al. |
| 3,807,255 A | 4/1974 | Baginski |
| 4,790,546 A | 12/1988 | Mendenhall |
| 5,240,267 A | 8/1993 | Owsen |
| 5,318,742 A | 6/1994 | You |
| 5,397,146 A | 3/1995 | Fischer |
| 5,520,585 A | 5/1996 | Green et al. |
| 5,540,485 A | 7/1996 | Enders |
| 5,730,453 A | 3/1998 | Owsen |
| 6,109,638 A | 8/2000 | Colegrove |
| 6,817,621 B2 | 11/2004 | Varan |
| 7,223,152 B2 | 5/2007 | Anderson |
| 2003/0197346 A1 | 10/2003 | Singenberger et al. |
| 2006/0207481 A1 | 9/2006 | McCarthy |
| 2011/0133427 A1 | 6/2011 | Bashan et al. |

FOREIGN PATENT DOCUMENTS

GB  2 459 263 A  10/2009

OTHER PUBLICATIONS

Field et al., "Creative minds sparkle in Sheffield", Sheffield Hallam University Newsletter, pp. 14, Sep. 2008.
Supplementary European Search Report from European Application No. 10 83 4302 dated Aug. 20, 2013.
"Stray Thoughts—Wood Pulp Bicycle Frames", Essendon Gazette, Apr. 16, 1914, pp. 1-2.

*Primary Examiner* — Joseph M Rocca
*Assistant Examiner* — Michael Stabley
(74) *Attorney, Agent, or Firm* — Greenberg Traurig, LLP

(57) ABSTRACT

A human powered land vehicle sufficiently rigid so as to transport a human rider constructed only from palpably recyclable and shreddably recyclable materials.

7 Claims, 9 Drawing Sheets

RECYCLABLE CARDBOARD BICYCLE

RELATED APPLICATIONS

This application is a continuation of U.S. application Ser. No. 12/631,831, filed Dec. 6, 2009, entitled "RECYCLABLE CARDBOARD BICYCLE", which is hereby incorporated herein by reference in its entirety for all purposes.

FIELD AND BACKGROUND OF THE INVENTION

The present invention relates to a recyclable velocipede and, more particularly, to a bicycle made from honeycomb cardboard or corrugated honeycomb cardboard, with various polyethylene terephthalate (PET) components.

Typically, bicycles and children's vehicles (tricycles, 'scooters', etc.) are constructed from durable, lightweight materials which are not easily recycled. Steel, plastic, rubber and numerous other materials are combined together to provide a comfortable, utilitarian vehicle for recreational use. The final products range from the moderately priced to the very expensive. Typically, such vehicles are purchased and kept until they become unusable, either due to damage or no longer being age appropriate. At this point the vehicle is usually discarded, destined to take its place in some unnamed landfill.

The current invention provides a lightweight, durable and fully recyclable bicycle. The embodiments depicted herebelow have an approximate weight of seven Kilograms, can bear the weight of at least two hundred Kilograms and is made of components which are 100% recyclable using standard recycling methods.

DEFINITIONS

Recycling

Strictly speaking, almost any material can be recycled. Therefore, for the purposes of this application, the terms 'recycle', 'recyclable', 'recycling', 'palpably recyclable' and the like are defined as referring to the process of reducing a material from a substantially solid form into a slurry, by adding water, and subsequently drying the slurry to produce a material substantially identical to the original material. In addition, the terms 'recycle', 'recyclable', 'recycling' and shreddably recyclable' are understood to also relate to the recycling process of a material such as PET, wherein the material is ground into flake form and cleaned thereby rendering it reusable in a variety of useful products such as carpet fiber, strapping, molding compounds, and non-food containers.

Honeycomb Cardboard

The current invention is constructed from honeycomb cardboard or corrugated honeycomb cardboard and includes PET and/or cardboard components. The terms 'corrugated honeycomb cardboard' and 'honeycomb cardboard' are defined herein as referring to material made up of at least two linerboards and honeycomb filling made from paperboard, fiberboard or cardboard. Honeycomb cardboard is well known in the art and its uses are well documented, for example in U.S. Patent Application 2006/0207481 to McCarthy which is incorporated by reference for all purposes as if fully set forth herein.

The preferred honeycomb cardboard for the embodiments described here below is known as Fini 440 due to the weight per square meter being 440 g p/sq. meter. Preferably the depth of the honeycomb cardboard filler is in a range between 15 mm and 70 mm. More preferably the range is between 20 mm and 50 mm. Most preferably the range is between 30 mm and 40 mm.

Cardboard

In addition to the materials specifically mentioned, the current invention may alternatively and/or additionally be comprised of cardboard and similar materials such as paperboard and fiberboard. The term 'cardboard' when not specifically designated as honeycomb cardboard, is a general reference to one or more of the cardboard-like materials namely, cardboard, paperboard, fiberboard, honeycomb cardboard, corrugated cardboard, corrugated fiberboard, corrugated paperboard and corrugated honeycomb cardboard, and/or a combination thereof Scooter The term 'scooter' is defined for the purposes of this application as a pedal-less vehicle propelled by the user's legs pushing off against a surface, usually the ground, unless specifically denoted as being motorized.

SUMMARY OF THE INVENTION

According to the teachings of the present invention there is provided a human powered land vehicle wherein the vehicle includes (a) a frame and (b) at least one pulpably recyclable wheel and shreddably recyclable hub arrangement coupled to the frame wherein the frame is propelled by a user of the vehicle by effecting the rotation of the at least one wheel and hub arrangement According to further features in preferred embodiments of the invention described below the pulpably recyclable wheel includes cardboard and/or paperboard and/or fiberboard and/or honeycomb cardboard and/or corrugated cardboard and/or corrugated paperboard and/or corrugated fiberboard and/or corrugated honeycomb cardboard and the shreddably recyclable hub includes PET and/or one or more thermoplastic material and/or one or more recycled plastic material.

According to still further features in the described preferred embodiments the vehicle is a unicycle.

According to still further features in the described preferred embodiments the vehicle is a bicycle.

According to still further features in the described preferred embodiments the vehicle is a tricycle.

According to still further features in the described preferred embodiments the vehicle is a scooter.

According to another aspect of the present invention there is provided a vehicle including (a) a pulpably recyclable fork and (b) at least one pulpably recyclable wheel and shreddably recyclable hub arrangement coupled to the pulpably recyclable fork.

According to further features in preferred embodiments of the invention described below the pulpably recyclable fork and wheel includes cardboard and/or paperboard and/or fiberboard and/or honeycomb cardboard and/or corrugated cardboard and/or corrugated paperboard and/or corrugated fiberboard and/or corrugated honeycomb cardboard.

According to still further features in preferred embodiments, the shreddably recyclable hub includes PET and/or one or more thermoplastic material and/or one or more recycled plastic material.

According to another aspect of the present invention there is provided a vehicle including a recyclable drivetrain wherein the recyclable drivetrain includes pulpably recyclable or shreddably recyclable material. Preferably the pulpably recyclable material includes cardboard and/or paperboard and/or fiberboard and/or honeycomb cardboard and/or corrugated cardboard and/or corrugated paperboard and/or corrugated fiberboard and/or corrugated honeycomb cardboard and the shreddably recyclable material includes PET and/or one or more thermoplastic material and/or one or more recycled plastic material.

According to further features in preferred embodiments the recyclable drivetrain includes a recyclable coupling apparatus operationally connecting at least one pulpably recyclable pedal to a pulpably recyclable wheel and shreddably recyclable hub arrangement.

More preferably, the recyclable coupling apparatus includes a crank arm operationally coupling the at least one pedal to the wheel and hub arrangement. Also more preferably, the recyclable coupling apparatus includes (a) a forward pinion operationally coupled to the at least one pedal; (b) an aft pinion operationally coupled to the wheel and hub arrangement; and (c) a timing belt operationally coupling the aft pinion to the forward pinion. Most preferably the timing belt includes a pulpably or shreddably recyclable material.

According to another aspect of the present invention there is provided a human powered land vehicle sufficiently rigid to transport a human rider and constructed only from pulpably recyclable and shreddably recyclable materials. Preferably the palpably recyclable materials include cardboard and/or paperboard and/or fiberboard and/or honeycomb cardboard and/or corrugated cardboard and/or corrugated paperboard and/or corrugated fiberboard and/or corrugated honeycomb cardboard, and the shreddably recyclable material includes PET and/or one or more thermoplastic material and/or one or more recycled plastic material.

According to still further features in preferred embodiments the vehicle includes recyclable elements such as a frame and/or a. fork and/or at least one wheel and/or a drivetrain and/or a sprocketed hub.

In keeping with the ever-improving efforts to cut down on waste pollution and provide recyclable solutions, the current invention provides a fully recyclable bicycle that is cheaply constructed and capable of holding a significant weight. The embodiments described herein are merely exemplary as the invention can be applied to children's play vehicles, such as pedal-less scooters, tricycles and the like as well as double bicycles and other recreation vehicles.

The vehicle frame, fork, wheels and transmission system in the current embodiments are constructed from folded and styled honeycomb cardboard with components constructed from cardboard and/or polyethylene terephthalate (PET).

In order to achieve a higher resistance of the cardboard against external influences such as moisture, the cardboard can also be composed of flutes which are lined with plastic material and/or wax and/or impregnating agents, or the cardboard can subsequently be coated with plastic material upon production thereof.

The cardboard preferably is treated with either organic or inorganic (but preferably organic) sealant for waterproofing. The cardboard also undergoes flame resistant treatment. Both of these processes are known in the art.

The current invention not only provides a new vehicle design but also a paradigm shift in the use [and discarding] of such vehicles. The current invention is a cheaply manufactured, durable and totally recyclable product. In a field where even the most simple bicycles are expensive and not easily disposed of, there has long been a need for a cheaper alternative as well as one that is fully recyclable in keeping with the needs of a society that is on the one hand an aggressive consumer and on the other hand becoming more and more ecologically concerned.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a recyclable cardboard bicycle according to the present invention may be better understood with reference to the drawings and the accompanying description.

Figure 1:
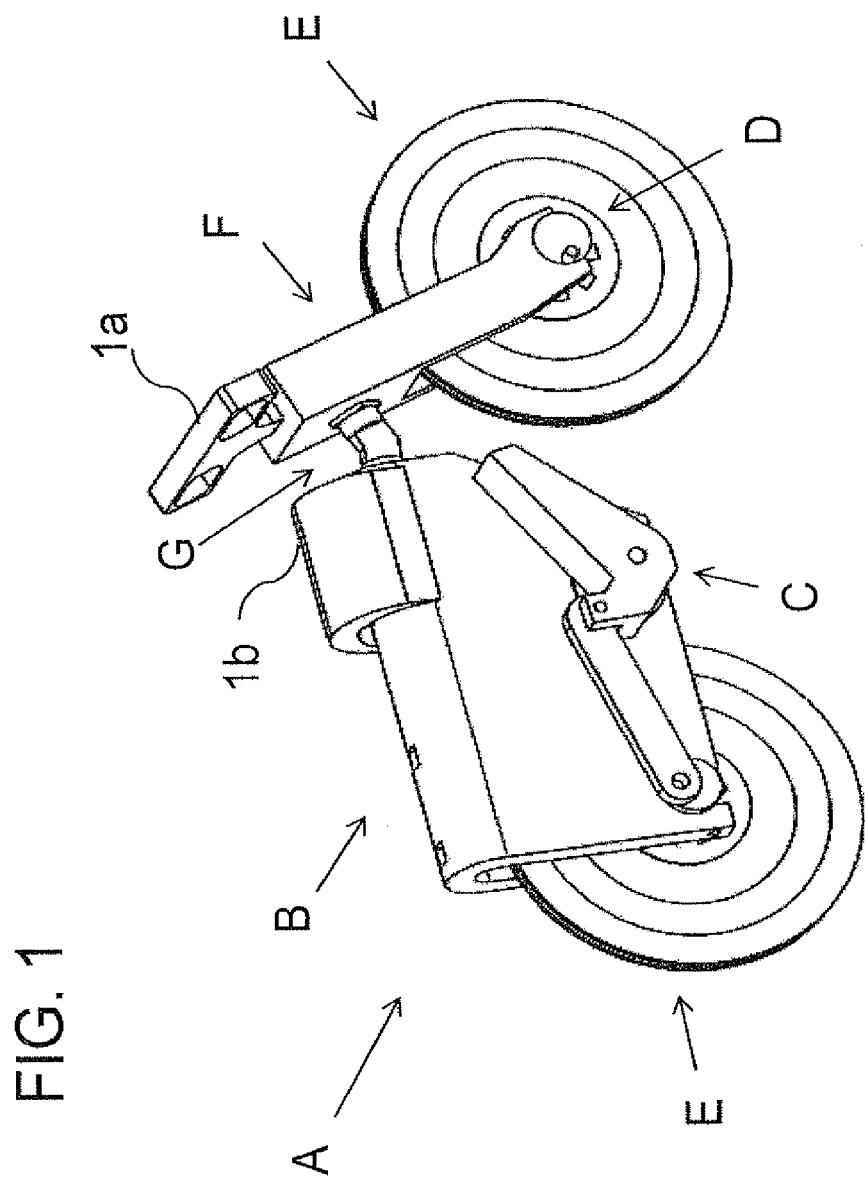
FIG. 1 is a diagram of an embodiment of the invention.

Referring now to the drawings, FIG. 1 illustrates an assembled recyclable bicycle [A] featuring a frame [B] a pedal-crank drivetrain [C], a hub arrangement [D], wheels [E], fork [F] and hinge [G]. In addition a cardboard handlebar [1a] is attached to fork [F] and a cardboard seat [1b] is detachably attached to frame [B]. The bicycle is constructed from honeycomb cardboard with cardboard arid/or PET components. The bicycle as depicted is capable of supporting the weight of at least 200 Kg.

Figure 2:
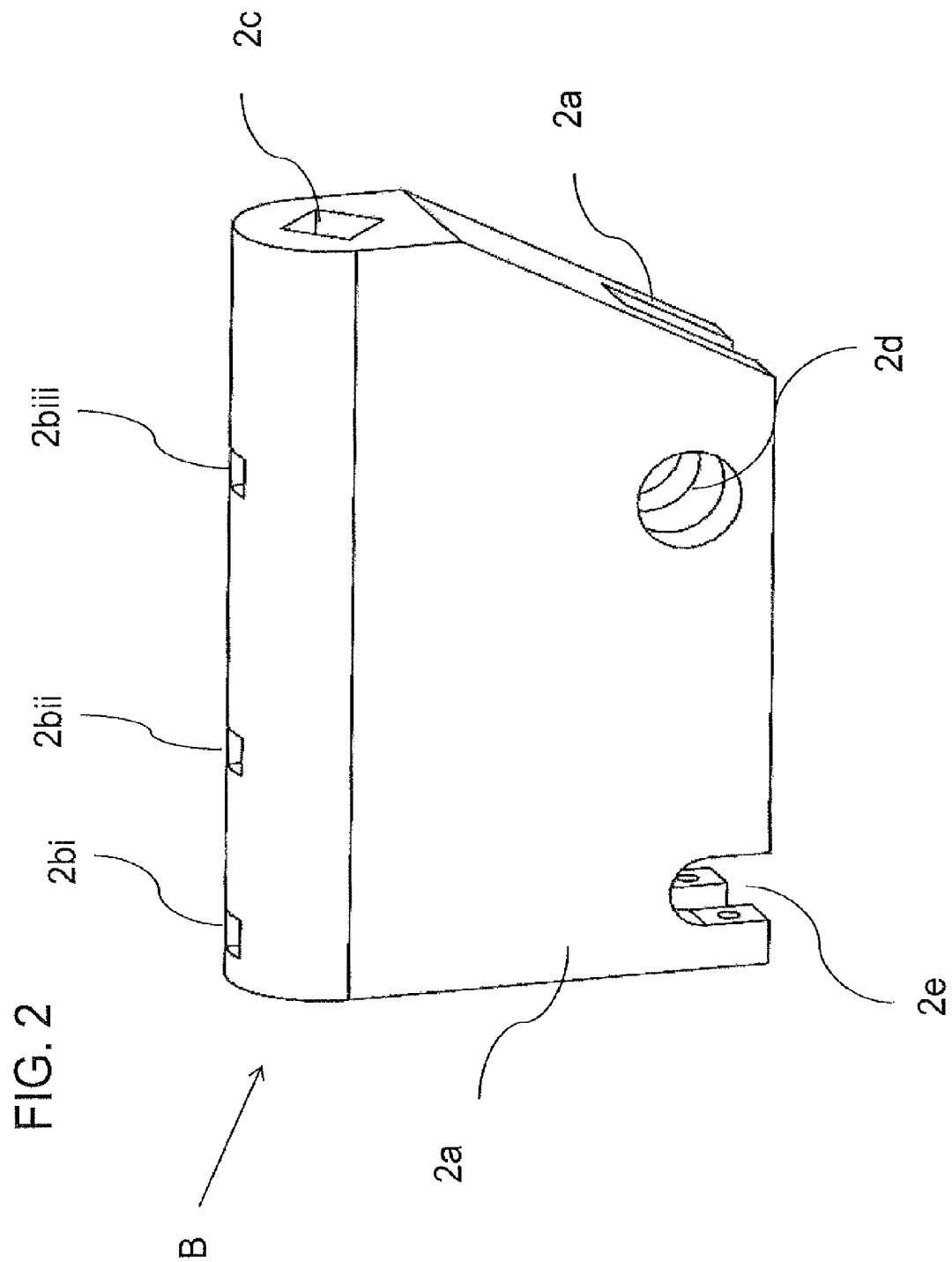
FIG. 2 is a diagram of the frame of an embodiment of FIG. 1.

FIG. 2 illustrates the frame [B] of the embodiment of FIG. 1. The frame is formed by bending a linerboard sheet into a U-shaped construct with side boards [2a] of equal length and filled with honeycomb cardboard filler. The transverse U-shaped cross-section is designed to support a significant weight, equal to or more than the combined weight of two average size adult males. The frame features three square indentions [2bi, 2bii, 2biii] on its dorsal surface. A seat (not shown) features a corresponding square protrusion for detachably coupling to the frame. The seat can be attached to the frame at any of the indentions according to need. For example, a person with long legs will place the seat at indention [2bii], thereby providing a raised sitting area. A shorter person would remove the seat from indention [2bii], in order to be closer to the pedals and place it either at indention [2bi] for improved aesthetics or at indention [2biii] for an additional rider.

On the front of the frame, there is constructed a diamond shaped indention [2e]. Here the bicycle frame [B] is mechanically coupled to the bicycle fork [F] via a PET hinge [G]. On each of the parallel side boards [2a] there are featured identical parallel cylindrical incisions [2d]. On the bottom left side of the frame is featured a U-shaped indention [2e] where the frame rests on the rear hub [D] of the rear wheel [E] of the bicycle.

Figure 3:
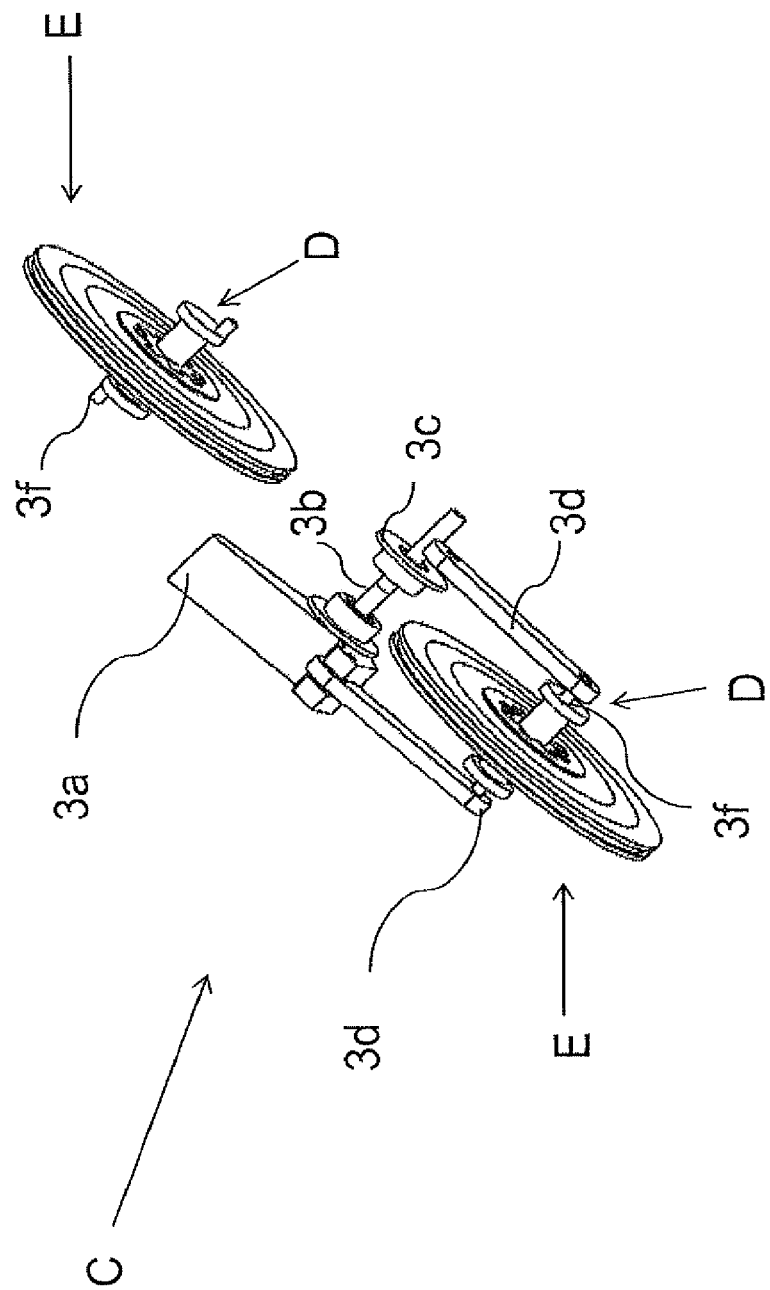
FIG. 3 is a diagram of the drivetrain and wheels of an embodiment of FIG. 1 with one of the pedals deleted.

FIG. 3 depicts the drivetrain [C] of the embodiment of FIG. 1 with one of the pedals deleted. Two wheels [E] are also depicted. The pedals [3a] of the drivetrain are coupled together through the parallel apertures [2d] in the side boards [2a] via a cylindrical connecting element [3b]. The pedals and connecting element are held in place by two aperture fitting covers [3c] which are each positioned respectively on either side of the bicycle between the pedal and frame. Each pedal [3a] is coupled to a crank arm [3d]. Each crank arm [3d] is coupled to the rear hub [D] via offset cylindrical flanges [3f].

Figure 4A:
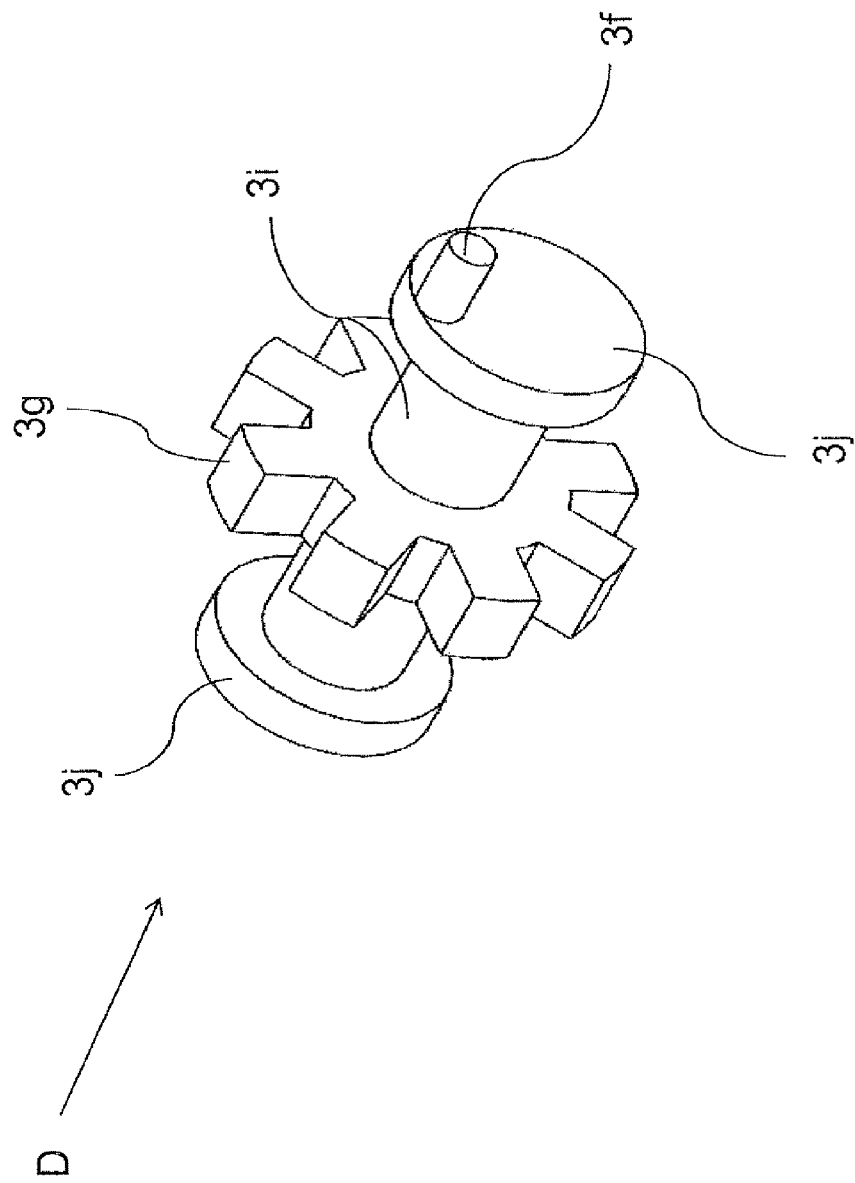
FIG. 4A is a diagram of the rear hub of an embodiment of FIG. 1.
Figure 4B:
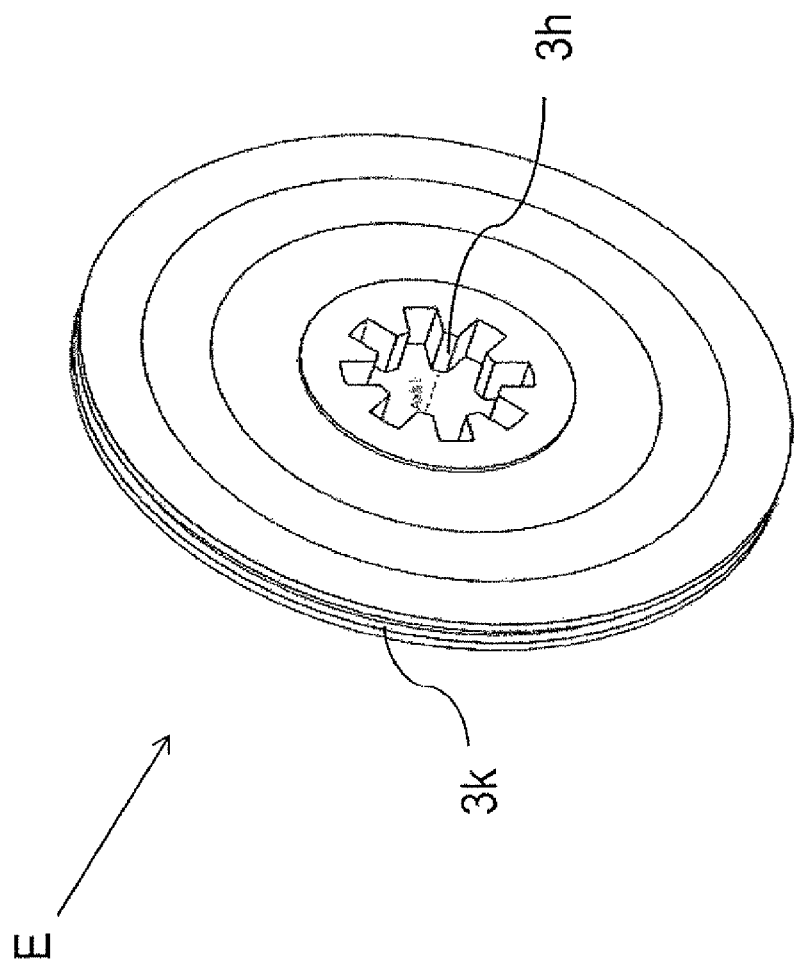
FIG. 4B is a diagram of one wheel of an embodiment of FIG. 1.

FIG. 4A is a diagram of the rear hub of the invention of FIG. 1. In FIG. 4a cylindrical flanges [3f] are mounted on left and right end caps [3j], protruding from the outer surfaces of the end caps [3j] and spaced away from the center of the end caps [3j] to allow sufficient rotation about the axis of rear hub [D]. Left and right end caps [3j] are connected via a cylindrical connecting element [3i]. A sprocket [3g] is mounted on the cylindrical connecting element [3i]. Sprocket protrusions [3g] fit into corresponding indentations [3h] (FIG. 4B) on the back and front wheels [E]. Back and front wheels [E] feature grooved rims [3k]. Grooved rims [3k] are filled with vulcanized silicone filler to provide solid tires. In the current embodiment, in order to simplify the manufacturing process, the front and rear hubs and wheels are identical in design and can therefore be used interchangeably. When pressure is applied alternately to pedals [3a] the drivetrain rotates along the axes of coupling element [3b] and rear hub [D] converting the reciprocating motion of the pedals into rotational motion.

Figure 5:
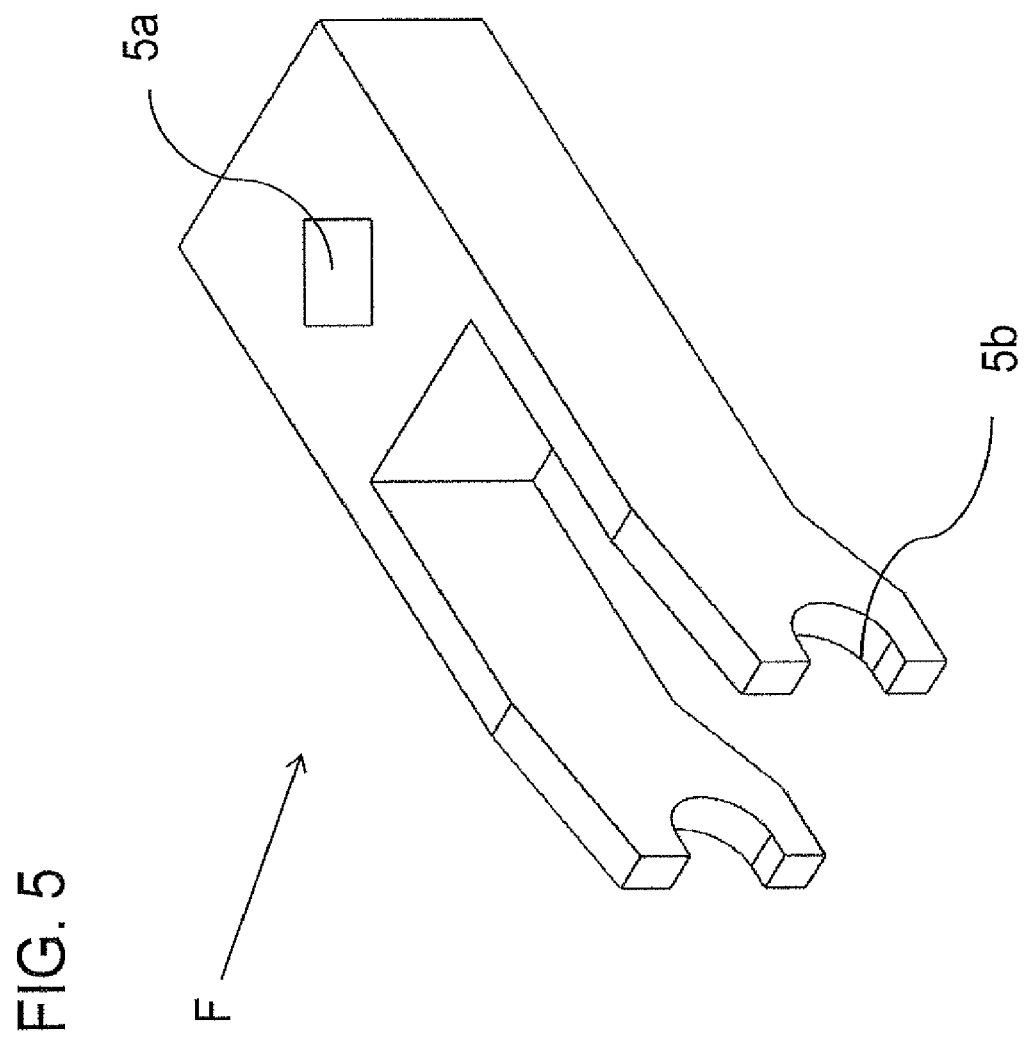
FIG. 5 is a diagram of the fork of an embodiment of FIG. 1.
Figure 6:
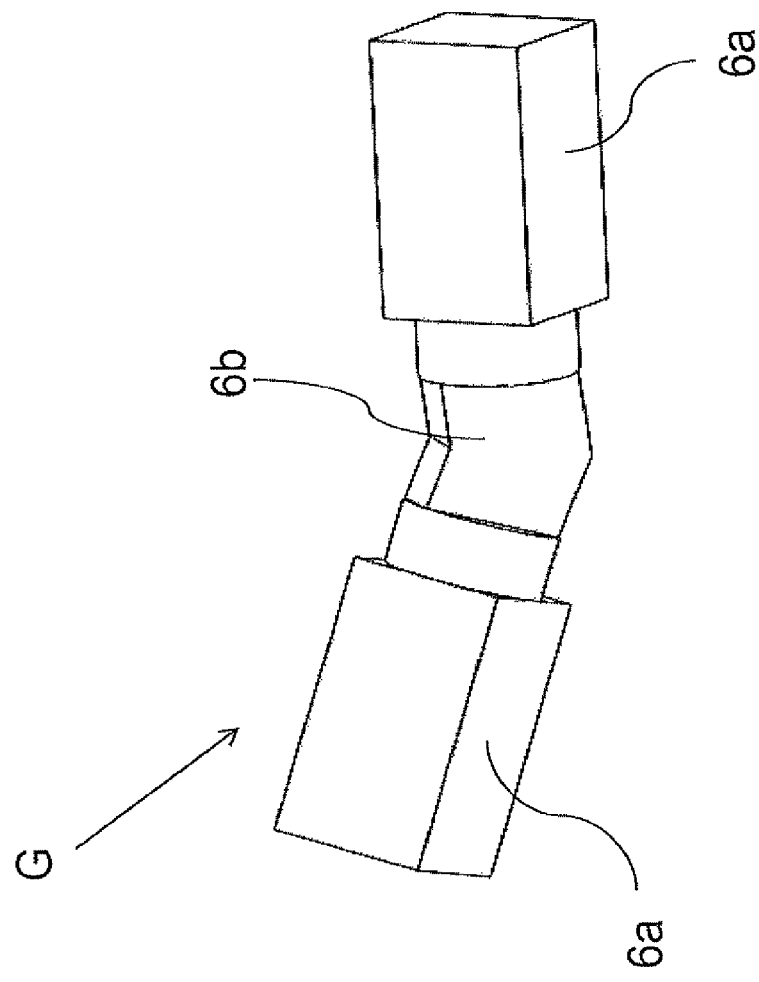
FIG. 6 is a diagram of a coupling PET hinge of FIG. 1.

FIG. 5 is a diagram of a cardboard fork [F] of the embodiment of FIG. 1. Fork [F] features a diamond shaped indention [5a] on the rear of the fork. Fork [F] is mechanically coupled to frame [B] via a connecting PET hinge [G] (FIG. 6). Flexible hinge [G] is formed in a diamond shape on either extreme [6a] of the hinge. The ends fit into the corresponding indentions on both the fork [F] and frame [B], flexibly coupling them together. The central segment [6b] of flexible PET hinge [G] having a relatively thin width of between 50 mm and 150 mm to provide flexibility on the one hand and durability on the other. Cardboard fork [F] has two parallel arms with U-shaped endings [5b]. The U-shaped endings [5b] rest on the cylindrical element [3i] of the forward hub arrangement [D]. Sprocket [3g] is mounted on cylindrical element [3i] which, in turn, connects end-caps [3j] upon which are perpendicularly mounted flanges [3f]. End caps [3i] secure fork [F] on the cylindrical element [3i].

Figure 7:
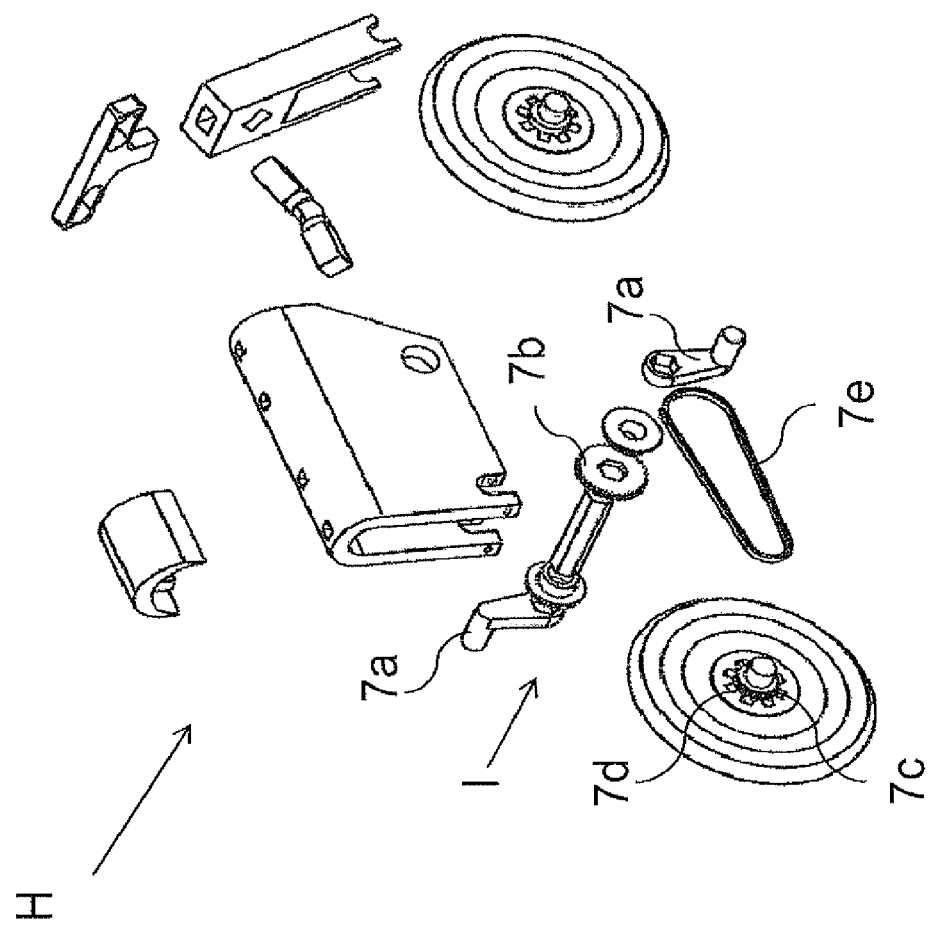
FIG. 7 is a diagram of second embodiment of the invention.

Another preferred embodiment is shown in FIG. 7. FIG. 7 is an exploded view of bicycle [H], wherein is depicted a belt driven bicycle [H] where the drivetrain [I] is constructed from forward and aft pinion mechanisms [7b and 7c] with a timing belt, otherwise known as a toothed belt [7e], connecting the pedals [7a] to the rear sprocket [7d]. All the components of the drivetrain are constructed from. PET and/or cardboard. All the other components of the embodiment of FIG. 7 are substantially as in the embodiment of FIG. 1.

Figure 8:
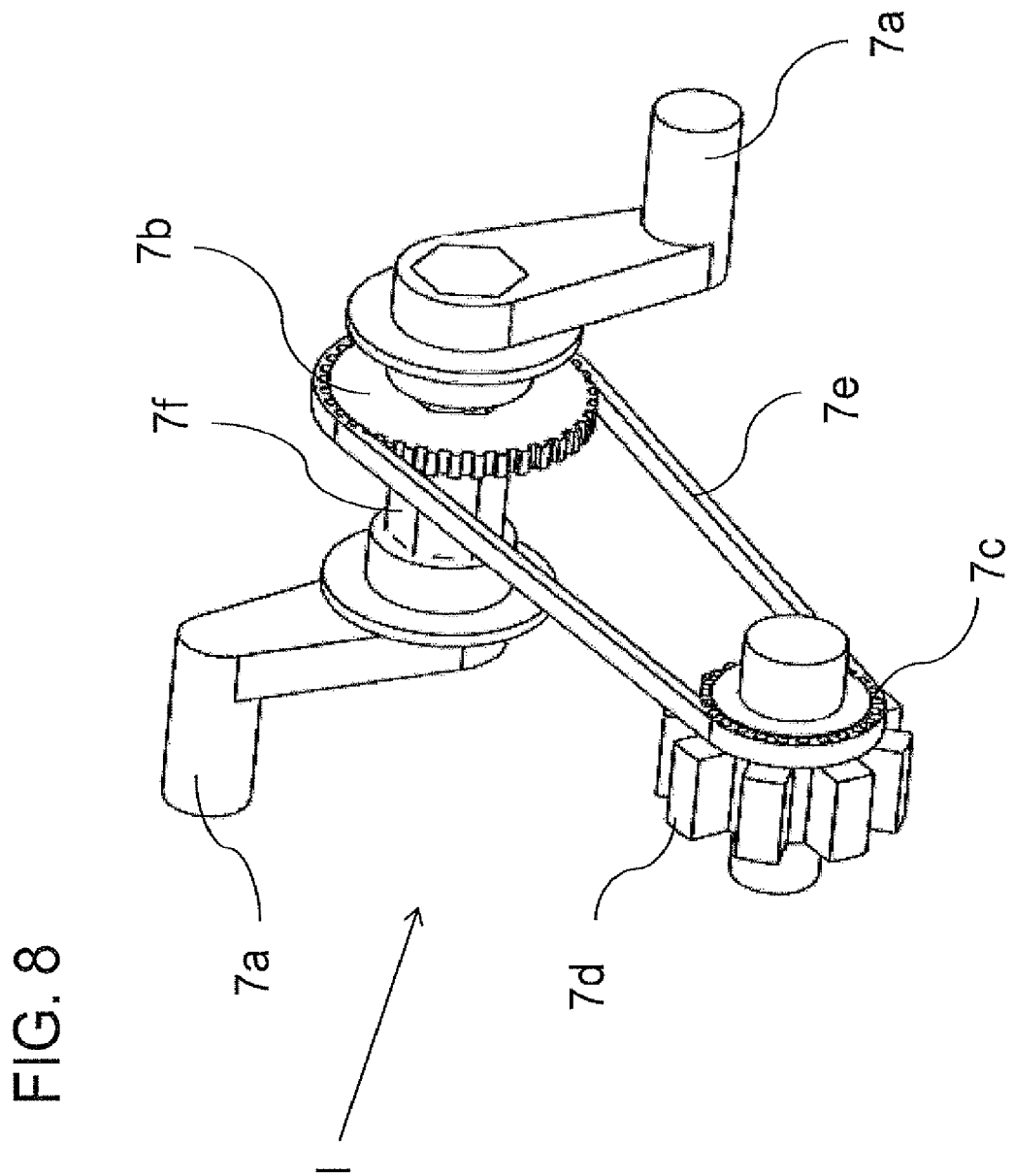
FIG. 8 is a diagram of the drivetrain of the second embodiment of the invention.

FIG. 8 is a rear isometric view of the drivetrain of FIG. 7. The forward pinion [7b] is mounted on a hexagonal connecting piece [7f], via which the external pedals [7a] are coupled together. A timing belt [7e] couples the forward pinion [7b] to the aft pinion [7c]. The aft pinion is mounted adjacent to the rear sprocket [7d]. The rear sprocket [7d] fits into the corresponding indentations [3h] in the rear wheel [E]. The timing belt drivetrain converts the reciprocating motion of the pedals into rotational motion, rotating the aft wheel.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A human-powered land vehicle,
wherein said vehicle comprise
a hub arrangement;
a frame; and
at least one wheel;
wherein the hub arrangement comprises a shreddably recyclable material;
wherein the frame and the at least one wheel comprise a pulpably recyclable material;
wherein the hub arrangement is coupled to the frame;
wherein the at least one wheel is coupled to the hub arrangement;
wherein the at least one wheel is adapted to rotate with the hub arrangement to propel the vehicle; and
wherein the vehicle is sufficiently rigid for supporting at least one human rider having a weight of at least 200 kilograms.

2. The vehicle of claim 1, wherein at least one of said pulpably recyclable wheel and said pulpably recyclable frame comprises at least one material selected from the group consisting of cardboard, paperboard, fiberboard, honeycomb cardboard, corrugated cardboard, corrugated paperboard, corrugated fiberboard, and corrugated honeycomb cardboard, and wherein said shreddably recyclable hub arrangement comprises at least one material selected from the group consisting of PET, thermoplastics materials, and recycled plastic materials.

3. The vehicle of claim 1, wherein said vehicle is a bicycle.

4. A human-powered land vehicle comprising
a hub arrangement;
a fork; and
at least one wheel;
wherein the hub arrangement comprises a shreddably recyclable material;
wherein the fork and the at least one wheel comprise a pulpably recyclable material;
wherein the hub arrangement is coupled to the fork;
wherein the at least one wheel is coupled to the hub arrangement;
wherein the at least one wheel is adapted to rotate with the hub arrangement to propel the vehicle; and
wherein the vehicle is sufficiently rigid for supporting at least one human rider having a weight of at least 200 kilograms.

5. The vehicle of claim 4, wherein the fork and the at least one wheel comprise at least one material selected from the group consisting of cardboard, paperboard, fiberboard, honeycomb cardboard, corrugated cardboard, corrugated paperboard, corrugated fiberboard, and corrugated honeycomb cardboard.

6. The vehicle of claim 4, wherein the hub arrangement comprises at least one material selected from the group consisting of PET, thermoplastics materials, and recycled plastic materials.

7. The vehicle of claim 4, wherein said vehicle is a bicycle.

* * * * *